US006721471B2

(12) United States Patent
MacKinnon

(10) Patent No.: US 6,721,471 B2
(45) Date of Patent: Apr. 13, 2004

(54) APPARATUS AND METHODS RELATING TO FLUORESCENT OPTICAL SWITCHES

(75) Inventor: Nicholas B. MacKinnon, Vancouver (CA)

(73) Assignee: Tidal Photonics, Inc., Vancouver (CA)

( * ) Notice: Subject to any disclaimer, the term of this patent is extended or adjusted under 35 U.S.C. 154(b) by 225 days.

(21) Appl. No.: 09/803,348

(22) Filed: Mar. 8, 2001

(65) Prior Publication Data

US 2001/0055441 A1 Dec. 27, 2001

Related U.S. Application Data

(60) Provisional application No. 60/188,653, filed on Mar. 10, 2000.

(51) Int. Cl.$^7$ .............................................. G02B 6/42
(52) U.S. Cl. .............................. 385/16; 385/18; 385/12
(58) Field of Search .............................. 385/16, 17, 18, 385/12; 250/226, 227.11, 227.13

(56) References Cited

U.S. PATENT DOCUMENTS

| | | | |
|---|---|---|---|
| 3,999,074 A | 12/1976 | Callaghan | 250/551 |
| 4,045,667 A | 8/1977 | Hanson | 250/226 |
| 4,315,147 A | 2/1982 | Harmer | 250/227 |
| 4,492,121 A | 1/1985 | Lehto | 73/705 |
| 4,617,461 A | 10/1986 | Subbarao | 250/229 |
| 4,704,656 A | 11/1987 | Neiger | 361/173 |
| 4,904,044 A | 2/1990 | Tamulevich | 350/96.18 |
| 4,919,512 A | 4/1990 | Flaherty | 350/96.29 |
| 5,046,806 A | 9/1991 | Kidder et al. | 385/16 |
| 5,290,419 A | * 3/1994 | Kambara et al. | 204/299 R |
| 5,892,862 A | 4/1999 | Kidder et al. | 385/16 |
| 6,005,663 A | * 12/1999 | Waterhouse et al. | 356/344 |

* cited by examiner

Primary Examiner—Khiem Nguyen
(74) Attorney, Agent, or Firm—Graybeal Jackson Haley LLP

(57) ABSTRACT

A fiber optic switching system which includes an optical switch having a movable actuator and a light fiber coupled to the actuator which terminates at an end target surface thereof for conducting excitation light from a light source to the optical switch mechanism. A flexible film or other surface whose response is conditioned to provide at least two different fluorescent surfaces is positioned such that an end surface of the actuator abuts or is placed in close proximity to the film throughout its movement from one position to another. A detector detects light emitted from the film. The actuator is movable so as to direct excitation light from the light fiber from the one fluorescent surface of the film to another and the detector detects light emitted from the film so as to determine which fluorescent surface of the film from which light has been emitted.

2 Claims, 15 Drawing Sheets

Principles of fluorescence

Illustration of fluorescence: An incident t photon is absorbed and transfers its energy to an electron (1), the electron loses some of its energy in non-radiative processes,(2), and then the electron makes a transition to the ground state, process (3), emitting a photon with energy of a longer wavelength of light.

APPARATUS AND METHODS RELATING TO FLUORESCENT OPTICAL SWITCHES

CROSS-REFERENCE TO RELATED APPLICATIONS

The present application claims priority from U.S. provisional patent application No. 60/188,653, filed Mar. 10, 2000.

BACKGROUND

The development of optical switches, including fiber optic switches, has been a result of a need to avoid electrical power in certain control lines because electrical switches in such situations can, for example, cause explosions in an explosive atmosphere and shocks if in the presence of liquid. Many optical switches are known in the art. See, e.g., U.S. Pat. No. 3,999,074; U.S. Pat. No. 4,045,667; U.S. Pat. No. 4,315,147; U.S. Pat. No. 4,904,044; U.S. Pat. No. 4,704,656; U.S. Pat. No. 5,892,862; U.S. Pat. No. 5,046,806.

For some optical switches, for example those containing a mirror actuator, the coupling efficiency of the reflected light and, therefore, the effectiveness of the signal detection is sensitive to alignment problems. The mirror actuator mechanism typically locates the mirror surface parallel to and in very close proximity to the fiber face in order to maintain good efficiency. In systems in which there is a gap between an end of the fiber and the mirror, the surfaces of the fiber and mirror may be prone to contamination, which can lead to each of back scattering and contamination, which in turn can lead to loss of light and hence reduced efficiency. Back scattering at any of the other optical interfaces can create additional noise in the optical signal and require additional signal processing or detector compensation to accurately detect the state of the switch.

One way of reducing the effect of back-scattered light on detector performance is to use fluorescence, such as atomic or molecular fluorescence, to create an optical switch. The property of fluorescence is well known in the art. Generally, an electron of an elemental or molecular target absorbs incident electromagnetic energy, typically light photons (FIG. 10), which transfers the energy of the photon to the electron. This raises the electron one or more energy level. This higher energy level is usually unstable. As the electron returns to the ground state it emits a new photon that has less energy than the original photon, which means that it has a longer wavelength of light than the photon absorbed. For example, a blue high energy photon can cause a red fluorescent photon. This change in energy levels between the original photon, which can be called illumination or excitation light, and the emitted photon is a characteristic property of a given compound and is known as the Stoke's shift (FIG. 11). As used herein, the term fluorescence also refers to two-photon and multi-photon excitation, quantum dots, which are about nanometer sized crystals made from materials such as cadmium selenide that when excited by higher energy light will emit light of lower energy. The wavelength emitted is determined by the size of the nanocrystal. A larger crystal produces longer wavelength light and a shorter crystal produces shorter wavelength light. These materials are commercially available from Quantum Dot Corporation of Hayward, Calif. These materials are known in the art, and other methods of accepting light of one wavelength or wavelength band and emitting light at a detectably different wavelength or wavelength band are also included herein.

There has been a need for multi-state optical switches that can provide multiple wavelength or color-based return signals from a single wavelength or wavelength band impulse signal, as well as for other functions provided by characteristics of fluorescence, either fluorescence alone or in combination with reflectance. The present invention provides these and other related advantages.

SUMMARY OF THE INVENTION

The present invention provides methods and apparatus that comprise optical switches that take advantage of fluorescence to enhance sensitivity, speed or effectiveness. In some embodiments, the present invention provides a target area comprising at least one target surface comprising a fluorophore-containing target material, wherein the target surface comprises at least a first target area that provides a first fluorescent response when illuminated by excitation light and a second target area that provides a second light response when illuminated; the second response can be either reflectance light or fluorescent light, or other desired light response. The excitation light can be optically guided to the target via an optical fiber or other optical light guide. The switch can detect the resulting fluorescent light emitted from the target, for example by collecting the light into an optical fiber or other optical light guide and optically guiding it to the detector. The detector, which in this embodiment can include an operably connected computer, spectrometer, spectrograph or other optical analyzer, measures at least one of the relative intensity or wavelength of the response from the target, such as the induced fluorescence emission of the first target area, then determines the presence or type of the fluorescence.

The excitation light can be UV light, blue light, green light or other energy able to induce fluorescence in the target fluorophore; typically, such excitation light will be referred to herein as blue light.

In one embodiment, actuating the switch causes an optical fiber or other light guide to move relative to the target areas or the targets to move relative to the optical fiber. (The present invention comprises multiple aspects, features and embodiments; such multiple aspects, features and embodiments can be combined and permuted in any desired manner unless otherwise clear from the context.) This introduces different target areas, at least one of which is fluorescent, into the optical path. By detecting the difference(s) between the target areas, the apparatus and methods determine the state of the switch. The apparatus can then report the result or initiate an action that the switch controls.

In one embodiment the present invention provides switches that provide an excitation energy, transmit the excitation energy to the target, collect the emanated response light from the target, and transmit the emanated response light through an optical detector system, which can be in a controller, that detects the ratio of the intensities or other difference of one or more wavelengths or wavelength bands of the emitted response. The present invention can be used in any device for which an optical switch may be advantageous, including for example cars, airplanes, motorcycles, boats, other vehicles, medical equipment such as surgical pencils and controllers, electronic devices such as computers, telephones, and e-commerce related devices, manufacturing apparatus such as devices in production lines, lathes and molds, and household appliances.

Another embodiment of the invention provides a fiber optic, or other light guide, switching system which includes an optical switch mechanism having a movable actuator and a light guide such as an optical fiber or liquid light guide coupled at an end of the light guide to the actuator wherein the light guide conducts light from a light source to the end of the light guide at the optical switch mechanism. One or both of the actuator and the target is movable relative to each other so as to direct the light emitted by the light guide from one target area to another, such as one fluorescence to another. In one embodiment, the differing fluorescent properties in the switch are provided by a film, further preferably a flexible film, whose surface is conditioned to provide at least two different fluorescent surfaces. The film or other target can be positioned such that an end surface of the actuator or light guide abuts the film throughout its movement from one position to another. A detector detects light emitted from the film or other target material and returned by a light guide, which may or may not be the same light guide as the illumination light guide. The detector determines from which target area, such as from which fluorescent material, the return light was emitted.

Alternatively, or additionally, the switch can contain one or more mirrors, lenses, beam splitters or other beam control devices that can direct the excitation and emission light from one target area to another, again such as from one fluorescent material to another, or direct the collection of the emission light such as the fluorescent light.

The film may have a fluorescent target area and a non-fluorescent target area. Alternatively, the film may have multiple fluorescent surfaces (and, if desired, one or more non-fluorescent surfaces) which emit fluorescence at detectably different wavelength regions or intensities. Another possibility comprises target areas comprising graduated strength or color, or both, of emission for use as continuously variable controllers. Such graduated areas can be continuous or comprise a plurality of detectably different steps, for example 5, 15, 25 or more. The detector may have at least one corresponding filter assisting the detection of the multiple switch states, or the information from the detector may be processed either in a detector or downstream and therefrom the characteristics of the response light can be determined.

In another embodiment, where the target surface comprises at least three different response areas, the switch provides at least three detection states. By wrapping the target surface around a drum or other rotating device such as a disc, wheel or a belt, or other device able to sequentially pass the target surface past a detector or the detector past the target surface, the switch can become a directional counter. For example, if the surface comprises red, yellow and green emitting fluorophores (or red and green and non-fluorescent), then the direction of the switch can be determined by whether the colors are being detected as: red-yellow-green, or green-yellow-red. The total number of passages of the colors can give a discernible number, which number can be increased or decreased as the colors are read. Preferably, the directional counter is operably connected to a electronic system, typically digital or analog, that counts the iterations.

An advantage of the flexible film abutting the end of the actuator or fiber, or other arrangement wherein the illumination provider abuts the target surface, is the lowered likelihood of misalignment. Because the flexible film conforms to the face of the fiber or actuator, it maintains the parallelism between film and fiber surfaces desirable to enhance high coupling efficiency. And, arranging the end of the fiber to abut the flexible film throughout its range of movement reduces the likelihood of contamination of the area between the fiber and film with fluids or air-borne particulate.

The light guide may be, for example, a single optical fiber, a liquid light guide or a group of fibers providing a single optical path to and from the switching actuator.

A directional coupler may be coupled to the light guide, for example to direct light returning from the optical switch mechanism to the detector. The detector may include a photo detector positioned to detect light emitted from, or otherwise emanating from, the film.

In a further embodiment, for example where the switch is used in a surgical pencil or other device that comprises a light source maintained outside the device, the switch may comprise an excitation light source, a coupler optical assembly to direct the excitation light into the device and collect the fluorescent emission from the device, a separator that separates the light emanating from the target(s) into particular wavelength regions to be detected (this separator can be used with other embodiments as well), and one or more detectors to detect these wavelengths. The switch can also further comprise a light source maintained within the device containing the switch, or within the confines of the switch itself.

In one embodiment the coupler optical assembly comprises a lens to collimate light from the excitation source. The light from the light source can be passed through a dichroic mirror oriented at an angle, for example 45 degrees, to the optical axis of light, which can be a collimated beam, and that passes the shorter wavelength light excitation light of the excitation source. The light passing through the dichroic mirror is then directed to the target, then back to the mirror where it is reflected to the detector. Alternatively, the dichroic mirror can pass the emanating light and reflect the illumination light, in which case the optical pathway will be appropriately altered to fit such arrangement.

In a further embodiment, for example where the switch is used in a surgical pencil or other device that comprises a light source maintained outside the device, the switch may comprise an excitation light source, an optical assembly to direct the excitation light into a connector that allows light to be introduced into the device and collect the fluorescent emission, a separator to separate the light emitted from the fluorescent target into particular wavelength regions to be detected and one or more detectors to detect these wavelengths.

In another embodiment of the invention the optical assembly within the coupler may comprise an arrangement of fibers or other light guides that conducts light from the illumination source to the target and collects light from the target and directs it to two or more optically filtered photo detectors.

It is possible to avoid the need for a directional coupler between the light source and the detectors by using a plurality of light fibers in, for example in a bundle, with only some coupled to the light source and others coupled to the detector(s). A gap can be generally provided between the mirror surface and the fibers, so that some off-axis rays can couple from one fiber to the other. Where the illumination fibers and the detection fibers can also contact the target surface, for example where the fluorescent light is detected after a delay, or where the illumination and detection light guides are disposed on opposite sides of the target material or surface and detect transmissive light or other non-reflectance light.

A dual fiber system can avoid the problems associated with gap contamination and other problems that attenuate the light by providing a transparent layer of selected thickness in front of the fluorescent surface. The flexible film may be transparent and of a selected thickness with a mirror coating on the back so that the film itself provides the requisite spacing without permitting the entry of contamination.

In a preferred embodiment the present invention provides controllers and surgical pencil assemblies, the surgical pencil assembly comprising: a handpiece, hand actuated switch, cable and connector incorporating an optical path including a proximal end and a distal end, the handpiece being configured to position the distal end of the optical path to the fluorescent target; a light emitter window proximate to the distal end to direct an illumination light to the fluorescent target and collect the emitted light from the target; a controller assembly coupled to the connector of the surgical pencil assembly at the proximal end comprising an optical or fiber optic light guide to receive emanating light conducted to the proximal end of the surgical pencil assembly from the fluorescent target by the surgical pencil assembly light guide and an optical system to conduct the emanating light along at least a portion of a light path to the detector assembly; a wavelength selection filter aligned with the collection light guide to be disposed in the light path, and the wavelength selection filter assembly selectively transmitting one or more desired wavelength bands of the emanating light.

In preferred embodiments that relate to this and other aspects of the present invention (which is so for other preferred embodiments unless a given aspect of the invention indicates that such embodiment does not apply to that aspect), the collection light guide transmits the emanating light to the controller, which controller can include a detector as described herein.

In further preferred embodiments, the controller further comprises a band pass filter maintained within the excitation light optical path, for example at the proximal or distal end of the excitation light optical path, and disposed between the excitation light emitter and the excitation light optical path, wherein the band pass filter transmits a selected wavelength band of light. The selected wavelength band can be a suitable wavelength of light able to induce fluorescence in the surgical pencil assembly fluorescent target.

In still further preferred embodiments, the illumination light transmitted to the target consists essentially of a selected wavelength band and the light collection system further comprises a long pass filter disposed in the light path, wherein the long pass filter blocks light having about the same wavelength as the selected wavelength band of illumination light and transmits other light. For example, the long pass filter can be disposed at the distal end of the light collection system and can block blue light if desired.

The wavelength selection filter assembly can be maintained upstream in the light path from the long pass filter or the long pass filter can be maintained upstream in the light path from the wavelength selection filter assembly, and the long pass filter can be maintained upstream from the collection light guide.

In other aspects the present invention provides surgical pencil assemblies, the surgical pencil assembly comprising: a body including a proximal end and a distal end, the body being configured to position the distal end of the optical path proximate to the fluorescent target, means for emitting an illumination light from a location of the body at least proximate to the distal end; means for collecting and conducting an emanating light from the fluorescent target along a light path to a controller assembly coupled to the connector of the surgical pencil assembly at the proximal end, the controller comprising an optical or fiber optic light guide to receive emanating light conducted to the proximal end of the surgical pencil assembly from the fluorescent target by the surgical pencil assembly light guide and an optical system to conduct the emanating light along at least a portion of a light path to the detector assembly; a wavelength selection filter aligned with the collection light guide to be disposed in the light path, the wavelength selection filter assembly selectively transmitting one or more desired wavelength bands of the emanating light.

In certain preferred embodiments, the target is illuminated by conducting the illumination light from a light source maintained at the proximal end of the surgical pencil assembly to a light emitter maintained at the distal end of the surgical pencil assembly switch via an illumination light guide and then emitting the illumination light to the fluorescent target.

In further preferred embodiments, the illumination light is transmitted through a band pass filter maintained at the distal or proximal end of the surgical pencil assembly, wherein the band pass filter transmits a selected wavelength band of light and blocks other light. The selected wavelength band can be light able to induce fluorescence in the fluorescent target.

In other preferred embodiments, the illumination light emitted from the light emitter consists essentially of a selected wavelength band and the light collection system further comprises a long pass filter disposed in the light path, wherein the long pass filter blocks light having about the same wavelength as the selected wavelength band and transmits other light.

In some preferred embodiments, the illumination light is conducted from a light source maintained at the proximal end of the surgical pencil assembly and the controller assembly to the light emitter at the distal end of the surgical pencil assembly via the illumination light guide, and wherein a band pass filter that transmits substantially only a desired wavelength region of excitation light is disposed at the distal end of the illumination light guide.

In other preferred embodiments, the controller assembly comprises a fixed lens that is matched to the numerical aperture of the light guide of the surgical pencil assembly. This lens collects collimated light from the illumination path and focuses and transmits it into the optical light guide at the proximal end of the surgical pencil assembly. It can also collect and collimate light emitted from the proximal end of the surgical pencil assembly light guide and delivers it into the optical path of the controller detector assembly. The emitted light being transmitted along the light path passes through optical transmissive and reflective filters that select and dispose the light toward the detectors.

In further aspects of the invention light from the excitation source can be coupled into a lens that collects and collimates the excitation light and delivers it into the optical filter assembly and then to the lens which couples the excitation light into the light guide of the surgical handpiece.

In other embodiments, relating to both surgical pencils and other switches as described herein, the optical switch can comprise a light source disposed at or near the target, such as a light emitting diode. The light from the diode then strikes the target surface, where it causes the desired response in the target material, such as fluorescence, and is then collected and analyzed as described elsewhere herein.

In still more aspects the present invention provides filter assemblies for a surgical pencil assembly to transmit the emission from the fluorescent target to a controller/detector, comprising: a casing including a distal end with a first opening to receive a proximal section of the surgical pencil assembly, and a transmission passage extending between the opening and the detector or detectors, the transmission passage being configured to transmit light along a light path from the distal end to the proximal end of the casing; a rotatable housing attached to the casing, the rotatable housing including a knob configured to be gripped by a user and a filter holder positioned in the casing, the filter holder having a plurality of windows; and, at least one filter received in one of the windows, the housing rotating within the casing to position the at least one filter in alignment with the light path for selectively configuring the controller for different devices or desired purposes.

In other preferred embodiments, the filter assembly further comprises a fixed lens that is matched to the numerical aperture of the light guide of the surgical pencil assembly. This lens collects and collimates light from the proximal end of the surgical pencil.

In a preferred embodiment, the switches can be used in an array. For example, a plurality of switches can be coupled to an array detector, or an array of detectors.

These and other aspects, features and embodiments are set forth within this application, including the following Detailed Description and attached drawings. In addition, various references are set forth herein, including in the Cross-Reference To Related Applications, that describe in more detail certain compositions, apparatus, methods and other information (e.g., spatial light modulators, etc.); all such references are incorporated herein by reference in their entirety and for all their teachings and disclosures, regardless of where the references may appear in this application.

DETAILED DESCRIPTION WITH REFERENCE TO THE DRAWINGS

The present invention provides methods and apparatus that comprise optical switches that take advantage of fluorescence to enhance sensitivity, speed or effectiveness. In some embodiments, the present invention provides a target area comprising at least one target surface comprising a fluorophore-containing target material, wherein the target surface comprises at least a first target area that provides a first fluorescent response when illuminated by excitation light and a second target area that provides a second light response when illuminated; the second response can be either reflectance light or fluorescent light, or other desired light response. The excitation light can be optically guided to the target via an optical fiber or other optical light guide. The switch can detect the resulting fluorescent light emitted from the target, for example by collecting the light into an optical fiber or other optical light guide and optically guiding it to the detector. The detector, which in this embodiment can include an operably connected computer, spectrometer, spectrograph or other optical analyzer, measures at least one of the relative intensity or wavelength of the response from the target, such as the induced fluorescence emission of the first target area, then determines the presence or type of the fluorescence.

Definitions. The following paragraphs provide definitions of some of the terms used herein. All terms used herein, including those specifically described below in this section, are used in accordance with their ordinary meanings unless the context or definition indicates otherwise. Also unless indicated otherwise, except within the claims, the use of "or" includes "and" and vice-versa. Non-limiting terms are not to be construed as limiting unless expressly stated (for example, "including" means "including without limitation" unless expressly stated otherwise). The terms set forth in this application are not to be interpreted in the claims as indicating a "means plus function" relationship unless the word "means" is specifically recited in a claim, and are to be interpreted in the claims as indicating a "means plus function" relationship where the word "means" is specifically recited in a claim. Similarly, the terms set forth in this application are not to be interpreted in method or process claims as indicating a "step plus function" relationship unless the word "step" is specifically recited in the claims, and are to be interpreted in the claims as indicating a "step plus function" relationship where the word "step" is specifically recited in a claim. Other terms and phrases in this application are defined in accordance with the above definitions, and in other portions of this application.

Figure 1:
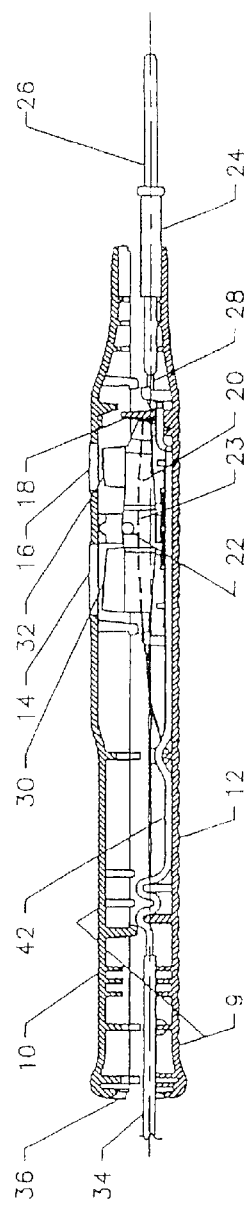
FIG. 1 is a side elevation view in section of an electrosurgical pencil with the halves of the casing slightly separated.

Turning to a further detailed discussion of the invention, in a first aspect the present invention provides an electrosurgical pencil. Referring to FIG. 1, the casing of the electrosurgical pencil 9 is made up of two casing portions 10 and 12. The internal components of the pencil 9 are installed on the recess in casing portion 12. The components include an electrode 26 which passes through a sleeve 24 and has attached at its anterior end a conductive cable 28. Cable 28 is run along the bottom interior surface of the casing portion 12 entering a cable sleeve 34 before exiting through the rear aperture 36 of the pencil 9. Voltage applied to cable 28 by a remote power source (not shown) is controlled by means of an optical fiber switching assembly composed of a light fiber 42 that runs in sleeve 34 adjacent cable 28. The optical fiber is captured by switching actuator 20. The fiber 42 runs all the way through the interior of actuator 20.

Figure 2:
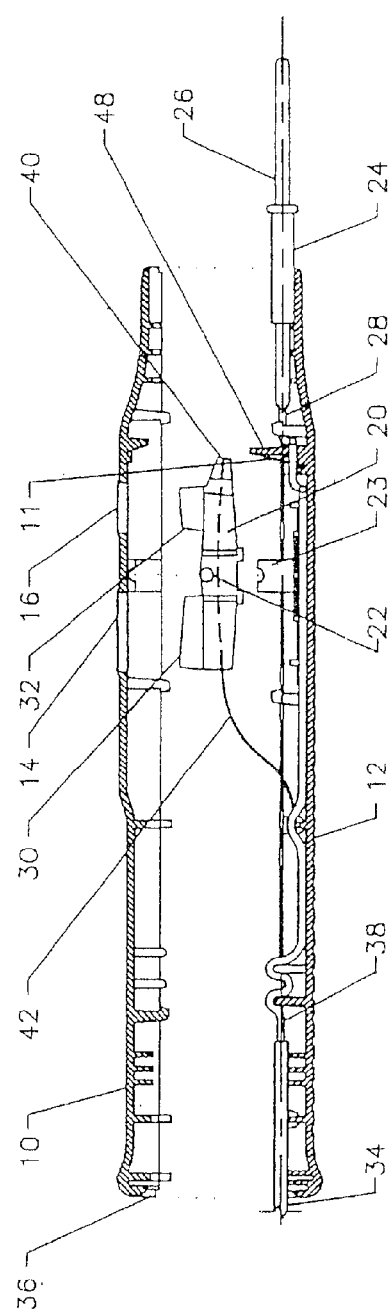
FIG. 2 is a side elevation view of the device of FIG. 1 with the two halves of the casing separated and the switching actuator detached.

Referring to FIG. 2, switching actuator 20 is pivotally attached to a pair of spaced apart mounting brackets 23 by means of pivotal pins 22 which project from either side of actuator 20 and fit into receptacles in the mounting brackets 23. Actuator 20 has a pair of protruding knobs 30 and 32 at opposite ends thereof. Knobs 30 and 32 pass through apertures 14 and 16, respectively, in casing portion 10 when the two casing portions 10 and 12 are engaged. Fiber 42 passes through actuator 20 and ends at end face 40 and then switching actuator 20 is pivotally mounted on mounting brackets 23 and end face 40 abuts or is placed in close proximity to flexible film 11.

Figure 3:
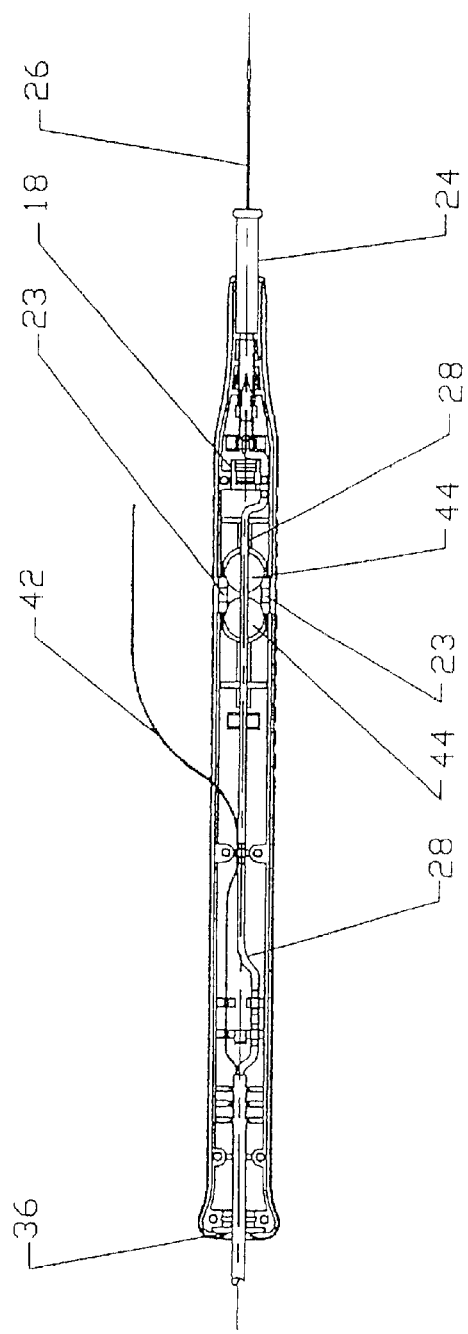
FIG. 3 is a plan view of the device of FIGS. 1 and 2 with the switching actuator removed from view.
Figure 4:
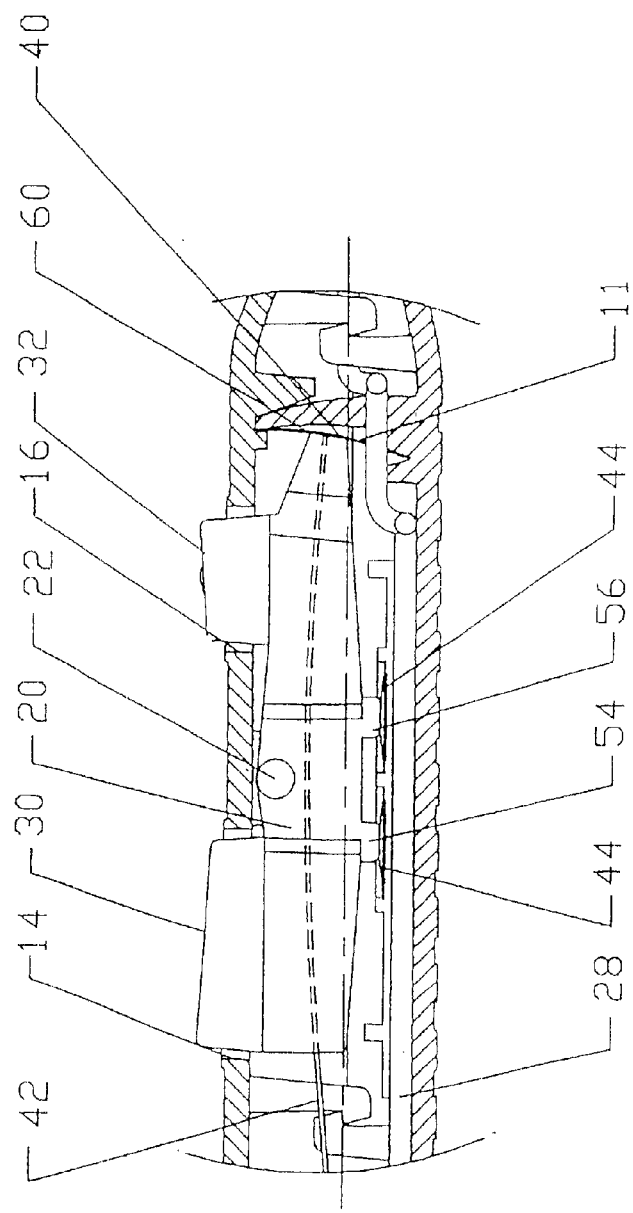
FIG. 4 is a partial sectional view in side elevation of the device of FIGS. 1 to 3 showing the switching actuator and the fluorescent target assembly.

Referring to FIG. 3, showing a top view of the device of FIGS. 1 and 2 without the actuator 20 in place, it will be seen that on the base of the casing portion 12 between mounting brackets 23 there are located two spring pads 44. The spring pads 44 are more clearly shown in FIG. 4 as consisting of a slightly convex sheet material mounted within a shallow circular receptacle. Contact projections 54 and 56 of the switching actuator 20 abut the spring pads 44 when in position. At the same time, end face 40 abuts flexible film 11 as shown. By depressing on knob 30, switching actuator 20 pivots about pins 22. When knob 30 is depressed it causes projection 54 to depress spring pad 44 and end face 40 to move upwardly while maintaining contact with flexible film 11. Alternatively, depression of knob 32 causes projection 56 to depress spring pad 44 and end face 40 to move downwardly while maintaining contact with flexible film 11. Spring pads 44 ensure that without pressure on either knob 30 or 32, switching actuator 20 will be maintained in an intermediate position.

Figure 5:
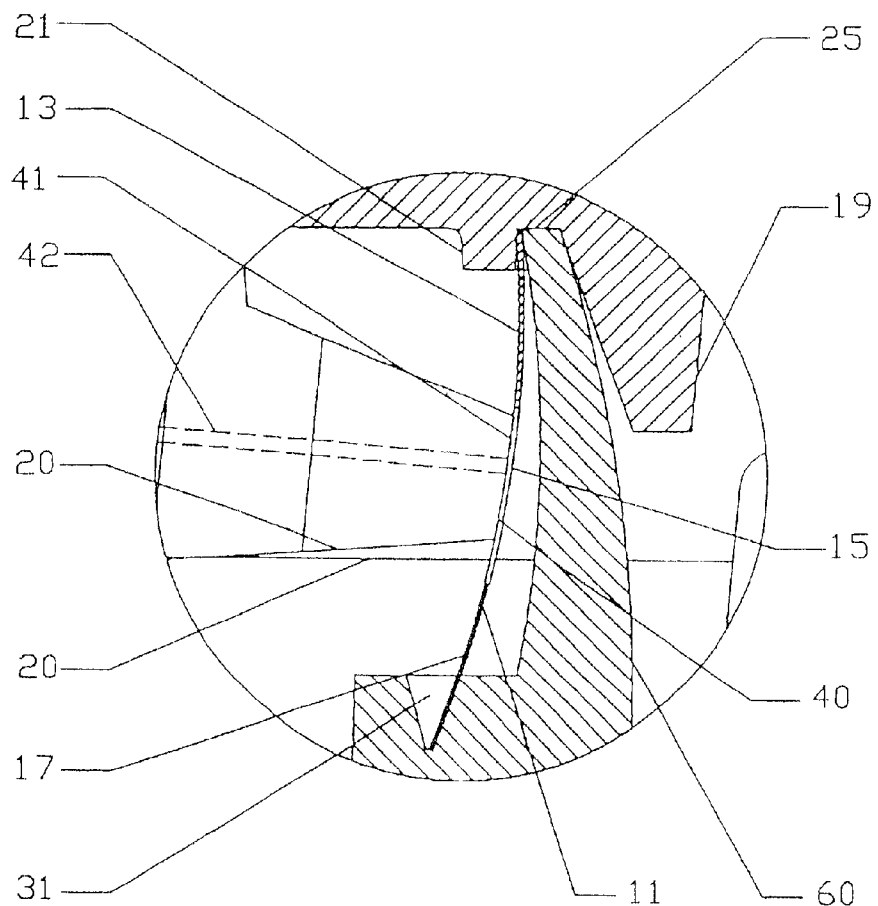
FIG. 5 is a partial sectional view in side elevation of the flexible filter, the end of the switching actuator, showing the fiber tip aligned to the central section of the fluorescent target film.
Figure 6:
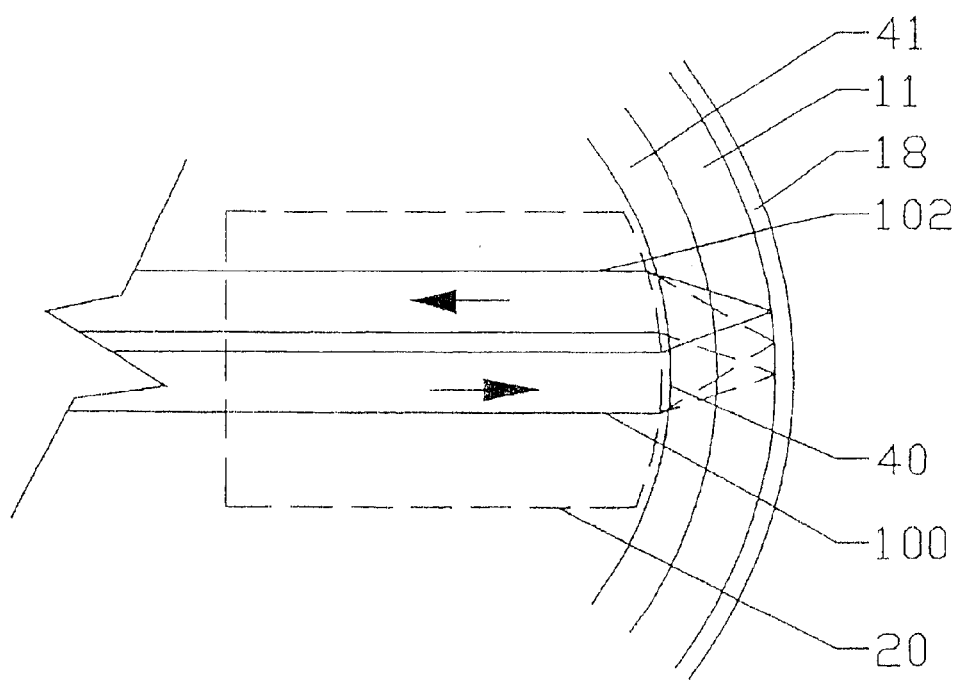
FIG. 6 is a partial sectional view of a portion of an embodiment of the flexible film as in FIG. 5 but showing the structure in more detail including three fluorescent sections, an intermediate transparent section and a transparent protective coating.

Referring to FIGS. 5 and 6, the flexible film mounting arrangement is shown as consisting of mounting bracket 60 affixed to casing half 12 and fitting between a recess 25 formed by projecting elements 19 and 21 belonging to casing portion 10. Flexible film 11 is positioned so that it is locked in position between recess 25 and mounting bracket 60. The film 11 itself is cemented in a trough 31 at the base of mounting bracket 60. Flexible film 11 is Mylar having a mirror surface 18 formed of an aluminum film on its surface remote from end face 40. The film 11 has a fluorescent coating 13 formed adjacent one side of a central fluorescent portion 15 and another fluorescent coating 17 of a different emission color formed on the other side thereof. A protective coating 41 overlays the film 11 to protect it from scratching.

In the intermediate position, end face 40 is positioned against the central fluorescent target 15 in which film 11 emits a wavelength band that brackets the wavelengths detected by both optically filtered detectors. Most of the light that exits fiber 42 excites fluorescence in film 11 and emitted fluorescent light is returned back along fiber 42. Because of the contact that is maintained between the flexible film 11, the actuator 20 and fiber 42, there is limited loss of light due to contamination or losses due to optical divergence due to the numerical aperture of the fiber. Upon moving so that end face 40 abuts fluorescent target 13, light emanating from fiber 42 passes into target 13, inducing fluorescence which is emitted directly into fiber 42 or reflected from surface 18 and returned into fiber 42. Similarly, when actuator 20 is pivoted so that end face 40 abuts fluorescent target 17, a similar effect is produced.

Figure 7:
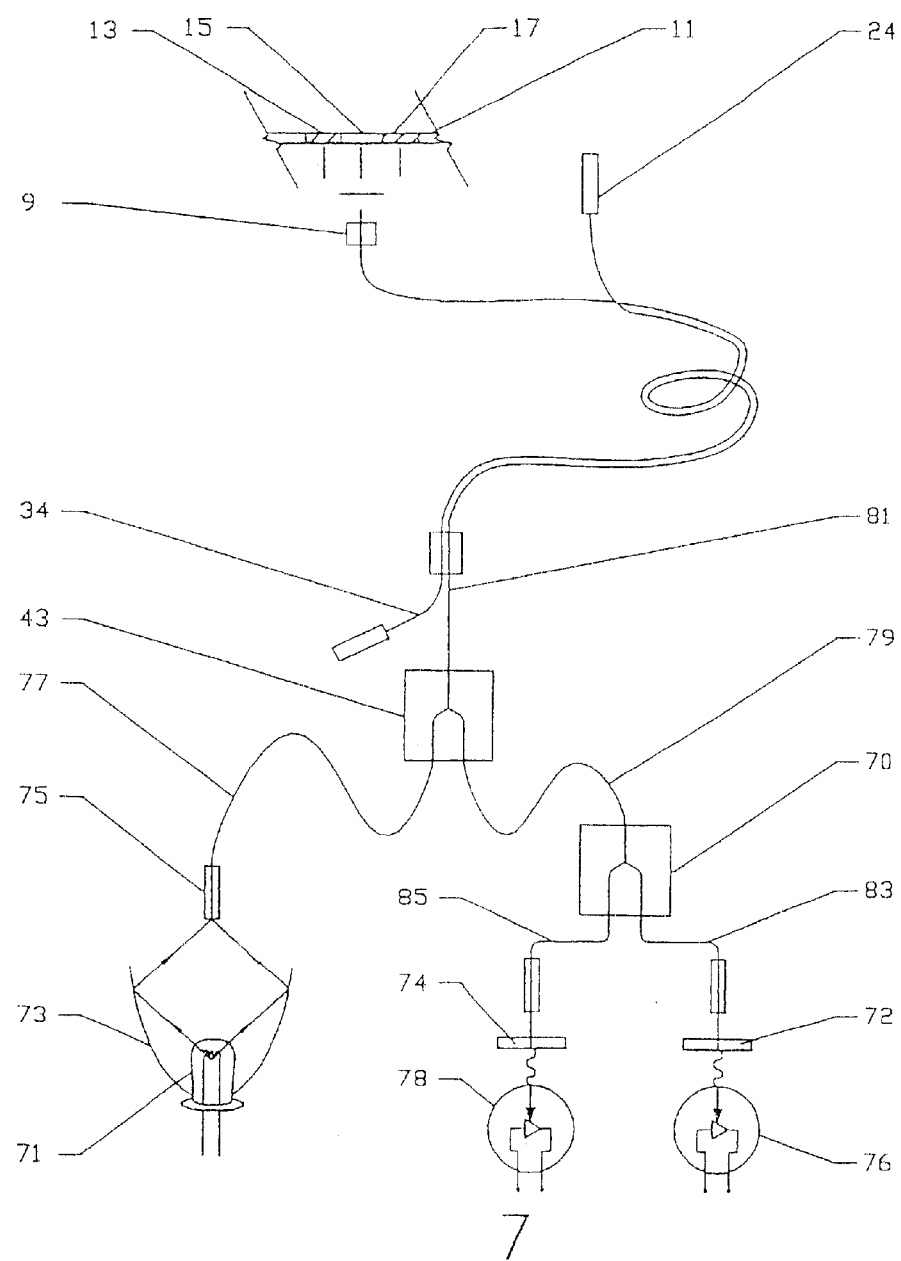
FIG. 7 is a schematic diagram of a single fiber switching system in which the film has a central fluorescent area and two adjacent different fluorescent wavelength areas.

Referring to FIG. 7, a broad band (multi-spectral) light source 71 emits light onto a parabolic reflector 73 which directs the reflected light into a ferrule 75 coupled to an optical fiber 77. Light from the fiber 77 enters a directional coupler 43 which directs approximately half of the light into fiber 81. The directional coupler 43 is usually a beam splitter but may also be a butt coupling of fibers or a graded index rod lens as is known in the art. The directional coupler 43 is equipped with a wavelength selection filter to select an appropriate excitation wavelength. Alternatively the wavelength selection filter may be incorporated into the reflector or exit window of light source 71. Light travels down fiber 81 into electrosurgical pencil 9. Light emerging from the end of fiber 81 is incident on one of three areas of film 11. Central broadband fluorescent portion 15 emits fluorescence detectable by both detectors and enhanced by mirror surface 18 on the back while fluorescent surfaces 13 and 17 comprise a compound that emits in a wavelength detected by only one or the other of the detectors. The emitted light enters into fiber 81 and travels down to directional coupler 43 where some of the light is directed into fiber 79 into beam splitter 70. Part of the light travels down fiber 83 and part down fiber 85. Filters 72 and 74 are complementary to filters 13 and 17, respectively, and are used to determine in which of the three positions the end face 40 of pencil 9 is located, in order to discriminate the wave length components contained in the emitted light. For example, if the light was passed first to a red emitting fluorescent surface and the emitted fluorescence then collected back into the fiber, by passing the filtered light through a complementary corresponding filter, it can be determined whether or not the end face was abutting the red fluorescent surface. Similarly, by using a green emitting fluorescent surface on the other side of the central portion of the film 11 and passing the corresponding emitted light through a corresponding filter, it can be determined whether or not the end face 40 was abutting the green fluorescent surface. Detectors 76 and 78 detect any light that may be transmitted through the corresponding filters 72 and 74.

By utilizing a fluorescent surface in contact with the optical fiber, sufficient contrast and efficiency of excitation and emission takes place to allow the different switching states to be determined. The absence of any gaps makes the switching assembly less sensitive to contaminants from adverse environments including fluids and air-borne particulate which may coat the optical faces if they are otherwise separated. The absence of any gap also makes the switching assembly insensitive to normal optical losses from separation between any source and receiver of similar dimensions and numerical aperture.

Figure 8:
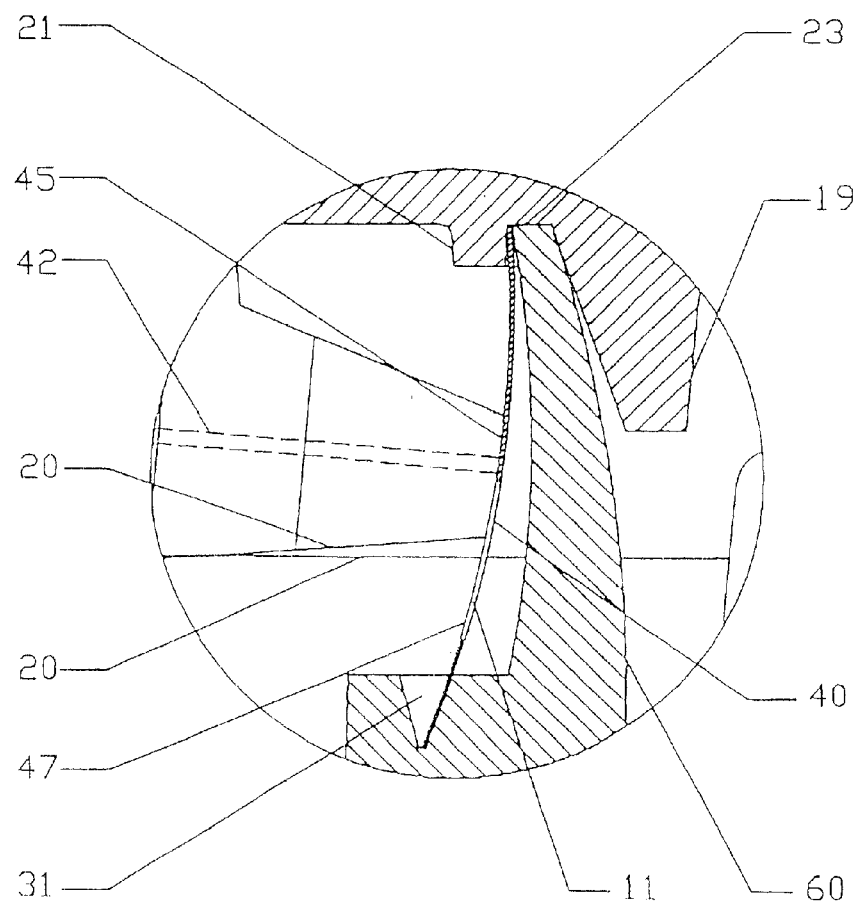
FIG. 8 is a partial sectional view in side elevation of the end of the switching actuator, showing the fiber tip aligned to the upper section of the film, having two different fluorescent surfaces.

Referring to FIG. 8 there is shown a flexible film 11 having only two surfaces. Surface 45 is non-fluorescent while surface 47 is fluorescent. Consequently, a single photo detector 76 with an excitation blocking long-pass filter or emission bandpass filter 72 in FIG. 9 will suffice to detect the two different positions and hence two states of the actuator or switching actuator 20.

Figure 9:
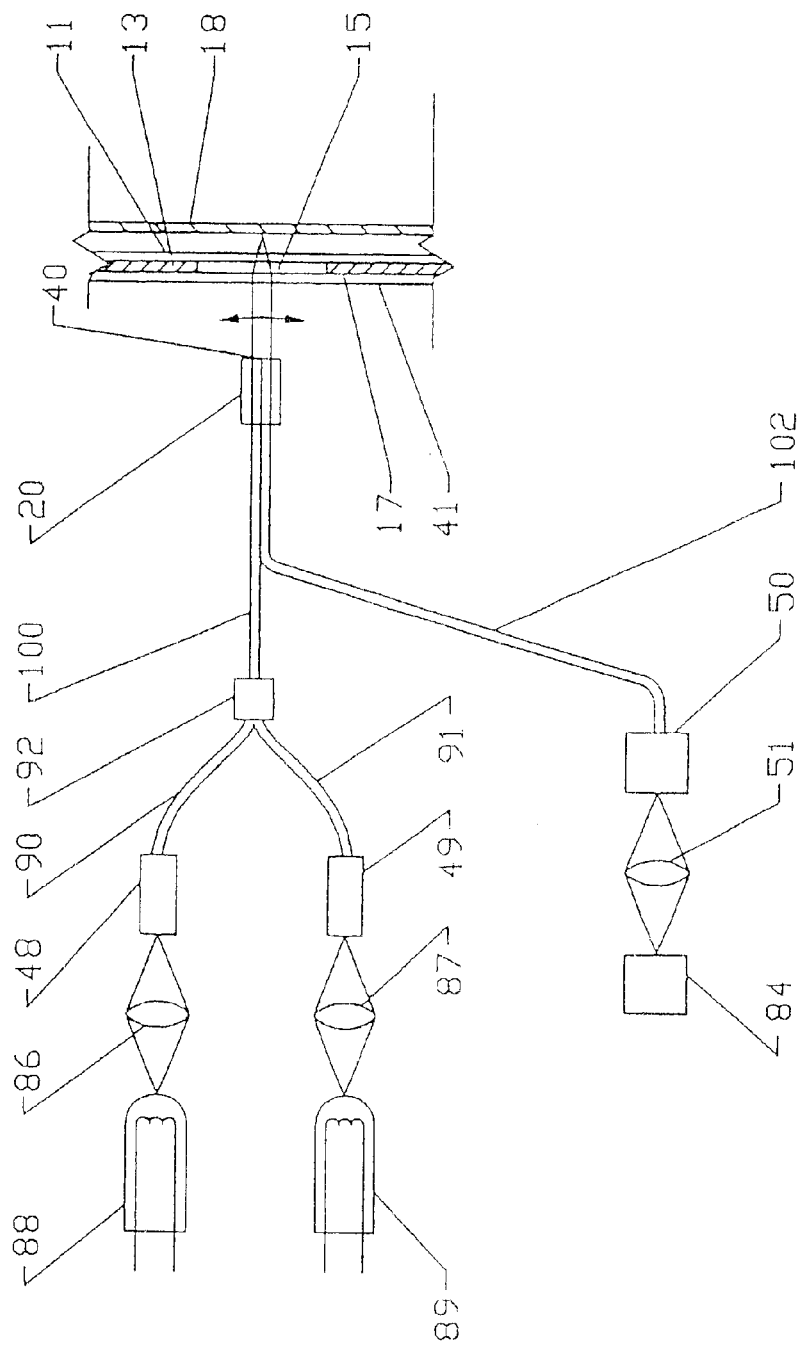
FIG. 9 is a schematic view of system utilizing a send fiber and a receive fiber.
Figure 10:
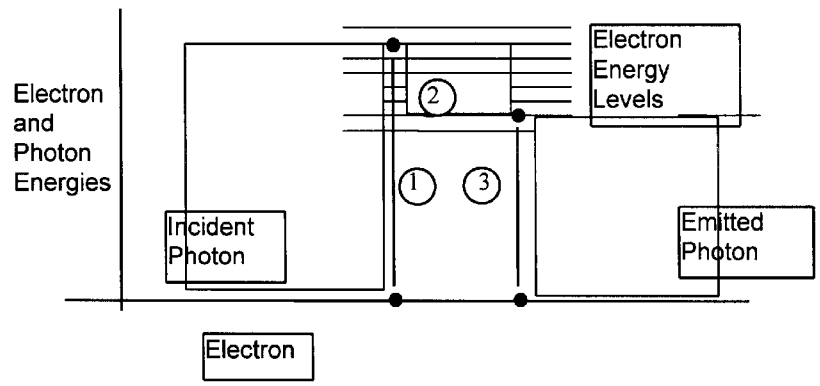
FIG. 10 is a schematic view of the energy transfer process at the atomic level that occurs during fluorescence.
Figure 11:
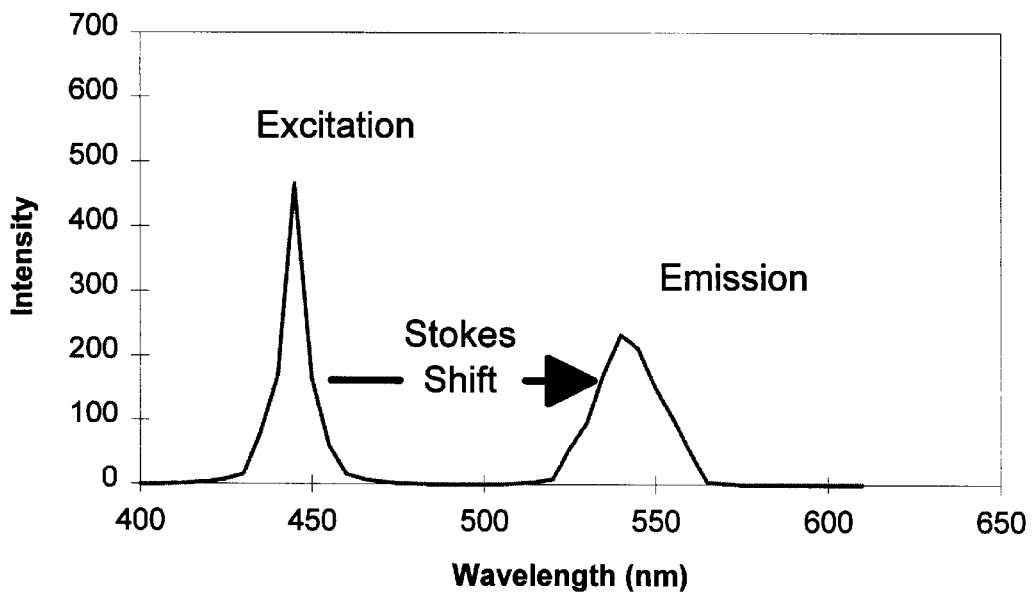
FIG. 11 is a graph that represents a typical example of the Stokes Shift in emission wavelength characteristic of fluorescence

Referring to FIGS. 6 and 9, a blue light emitting diode 88 is focused by lens 87 onto ferrule 48. The light enters fiber 90 and conducts to coupler 92 where the send and return fibers are bundled into fiber assembly 100. The blue light arrives at actuator 20 from which it is emitted and is incident upon the flexible film 11. The light passes through the clear protective coating 41 and excites fluorescence in the fluorescent material. Some fluorescent light is emitted and directly enters the optical fiber and some passes through film 11 and is reflected from mirror surface 18. The emitted light enters return fiber 91 and is conducted to dichroic optical block 87. Optical block 87 collimates the beam emitted from fiber 90 and spectrally splits the beam into two paths, that are focused onto dual detector assembly 89. The gap that would normally be required in order to couple light from one fiber to the other is substituted for by protective clear coating 41 which acts as a spacer and provides a smooth surface for contact with end face 40 and prevents abrasion of the film 11, contamination and other problems that attenuate the light.

It is clear that the electrosurgical pencil 9 is but one of many different devices in which the invention could be employed. For example, the invention could be incorporated into an ordinary dual or multistate switch on a switch panel. It could be used to detect slight misalignment on critical machine parts or other surfaces for which careful alignment is desired by providing a gradated or graduated response device, such as a film comprising a continuously varying or step-wise varying gradient, wherein the level of misalignment is correlated to a graduated light response that can vary, for example, in color or intensity. A slight change in alignment would change the amount of reflected light or fluorescent light entering the fiber.

Thus, in some aspects the present invention provides a fiber optical switching system for use with a light source and detector, comprising: an optical switch having a movable actuator; an optical fiber coupled to the actuator and terminating substantially at an end surface thereof for conducting light from the light source to the optical switch mechanism; a flexible film, or other mechanical element whose surface is conditioned to provide at least two fluorescent surfaces that when illuminated by light of a shorter wavelength, will emit light at a longer wavelength; wherein each of the two or more fluorescent surfaces emit light in different wavelength regions when excited by the same shorter wavelength illumination and are positioned such that an end surface of the optical fiber abuts or is placed in close proximity to the film throughout its movement from one fluorescent surface to another, wherein light emitted by the fluorescent surface is collected by the optical fiber: and, a detector coupled to an end of the optical fiber for detecting light emitted from the fluorescent film into the optical fiber so as to determine from which fluorescent surface of the film light has been emitted.

In some embodiments, the film has a fluorescent coating applied to a surface furthest from the end surface of the optical fiber and the film against which the fluorescent coating is applied emits light in a selected wavelength region when excited by illumination by light of a shorter wavelength. The system can further comprise a directional coupler coupled to the optical fiber means to direct light returning from the optical switch to the detector and the detector can include a photodetector positioned to detect light emitted from the film into the optical fiber means. The film can have a fluorescent surface abutting an end surface of the optical fiber in a first position of the actuator and a non-fluorescent surface abutting an end surface of the optical fiber in a second position of the actuator, and the film can have more than two fluorescent surfaces and the detector includes as many photo detectors and wavelength selective filters as there are fluorescent surfaces. The flexible film can include a transparent substrate, a mirror coating on a back surface of the substrate and fluorescent coatings on a front surface of the substrate, and can further include a scratch resistant transparent coating over the film. The system can further comprise a light source emitting one wavelength region of light and wherein the fluorescent surfaces are conditioned to emit wavelengths matched to the wavelength of light reflected or transmitted from or through complimentary optical filters to two or more photo detectors, which will detect the respective wavelengths of light emitted.

In other aspects the present invention also provides a fiber optical switching system, comprising: (a) a light source emitting a single wavelength region of light; (b) an optical switch having a movable actuator; (c) an optical fiber coupled to the actuator and terminating substantially at an end surface thereof for conducting light from the light source to the optical switch; (d) a flexible fluorescent film mounted in the optical switch having a plurality of different fluorescent surfaces and positioned such that an end surface of the optical fiber abuts or is placed in close proximity to the film as it moves among positions in which light from the light fiber means is incident on the fluorescent surfaces; and (e) a plurality of photo detectors and associated filters, each photo detector and filter corresponding to a respective one of the fluorescent surfaces, the photo detectors and filters coupled to the optical fiber means and being operative to detect light emitted from the film into the optical fiber so as to permit determination of the location of the actuator. The light fiber means can provide a single light path to and from the optical switch mechanism.

In some other aspects the present invention also provides a fiber optical switching system, comprising: (a) a light source emitting a single wavelength of light; (b) an optical switch having a movable actuator; (c) an input and output optical fiber coupled to the actuator and terminating substantially at an end surface thereof the input optical fiber for conducting light from the light source to the optical switch and the output optical fiber for conducting light from the optical switch; (d) a flexible fluorescent film mounted in the optical switch having a first fluorescent surface and a second fluorescent surface and positioned such that an end surface of the optical fibers abut the film as it moves from a position in which light from the input light fiber is incident on the first fluorescent surface to one in which it is incident on the second fluorescent surface; and (e) a photo detector coupled to the second optical fiber and being operative to detect light emitted from the film into the second optical fiber so as to permit determination of the position of the actuator.

The complementary optical filters optically linked to two or more photo detectors, which will detect the respective wavelengths of light emitted, can comprise: a) a lens placed downstream from the light source to collimate the light emitted from the light source; b) a dichroic filter placed in the path of the collimated light and downstream from the lens above and positioned 45 degrees off-axis to the optical fiber in the connector of the surgical pencil, that passes wavelengths of light emitted from the light source but reflects through ninety degrees longer wavelengths of light emitted via the optical fiber from the optical switch; c) a lens placed downstream of the dichroic filter to focus collimated light from the light source into the optical fiber and to collimate light returning from the optical fiber; d) a second dichroic filter placed at 45 degrees to and in the path of the collimated light emitted from the optical switch but reflected through ninety degrees from the first dichroic filter; e) a detector positioned to collect the light transmitted through the second dichroic filter; and f) a detector positioned to collect the light reflected from the second dichroic filter.

The dichroic filters can be placed on the 90 degree angled surfaces of a 45 degree/45 degree/90 degree prism. The multiple fibers from multiple optical switches can be arranged in an array at the coupler input lens and the second dichroic mirror can be replaced by a focusing lens and an array or imaging sensor such as a color CCD imaging device equipped with a red/green/blue matrix filter detects the emitted light from the array of optical switch fibers. Multiple fibers from multiple optical switches can be arranged in an array at the coupler input lens and the second dichroic mirror can have two focusing lenses placed downstream of the reflective and transmissive paths respectively and an array or imaging sensor such as a CCD imaging device can detect the emitted light from the array of optical switch fibers. Further, the second dichroic filter can be replaced by a wavelength dispersive optical element such as a prism or diffraction grating and one or more photo detectors can be placed in positions to detect the dispersed complimentary wavelength or wavelengths of light emitted by the optical switch.

Figure 12:
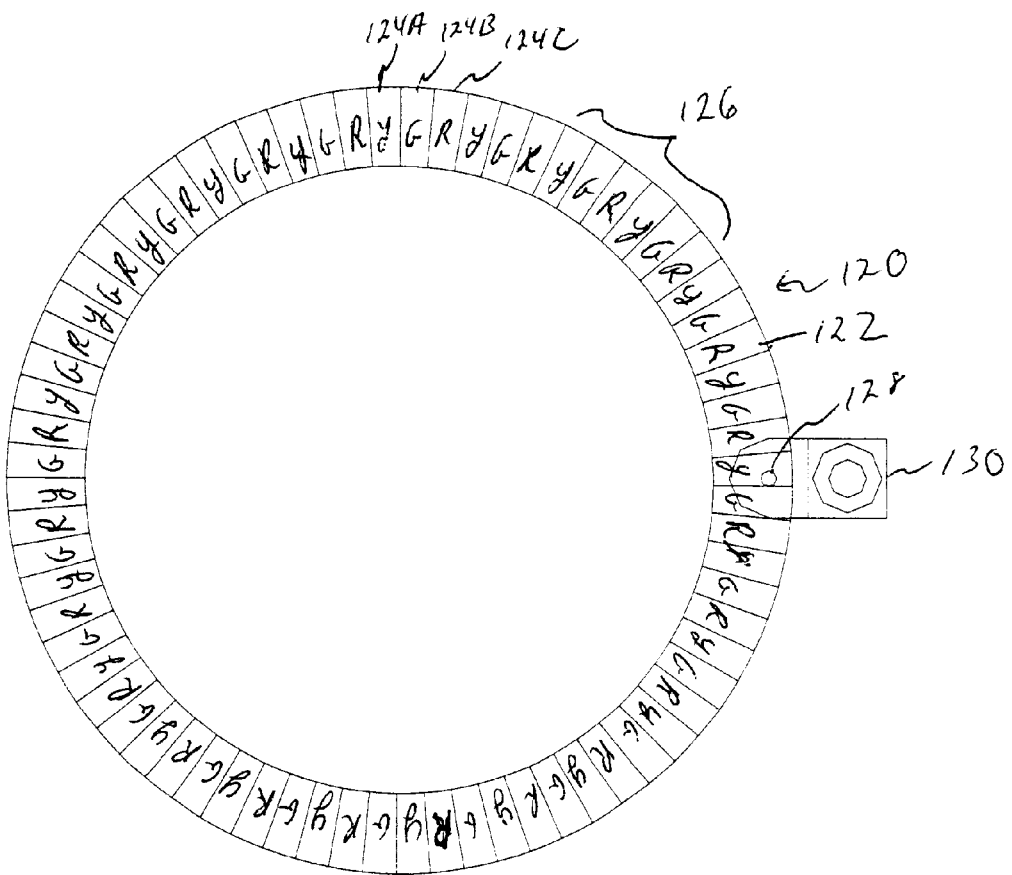
FIG. 12 depicts a top plan view in schematic form of a disk comprising a plurality of different light response target areas.

Returning to the Figures, FIG. 12 depicts a disk 120 comprising an outer portion 122 containing a target surface 126. Target surface 126, in turn, comprises a plurality of target areas 124A–C. As depicted in FIG. 12, target areas 124A–C contain a plurality of fluorophore target materials that in the Figure provide a yellow (Y), green (G) and red (R) fluorescent response when illuminated by an excitation light. The wavelengths in the response do not need to represent completely different colors, like green and red, but can also represent longer and shorter wavelengths within a given color, or different intensities, or different combinations of colors (such as in the color yellow, which can be, for example, a combination of the colors green and red). Thus, first target area 124A provides a first fluorescent response when illuminated by the excitation light, second target area 124B provides a second fluorescent response, and third target area 124C provides a third fluorescent response. If desired, at least one of the target areas 124A–C can contain substantially no fluorophores, which would mean that the essential light response for purposes of the optical switch would be a non-fluorescent response.

The light responses from the target areas 124A–C are detectably different, which means that the response from one target area to another can be differentiated by a detector. Suitable detectors include a pixelated detector, such as a charge coupled device (ccd) or a charge injection device (cid), a spectrometer, a complementary metal-oxide semiconductor (cmos), or other desired detector able to differentiate between different values in a light response, such as different intensities, different wavelengths or wavelength bands or other desired optical property. If desired, the fluorophores located at the different target areas 124A–C can respond to different wavelengths or wavelength bands of excitation light, or they can respond to a same wavelength or wavelength band of excitation light. Thus, the target areas 124A–C provide at least two, and preferably three or more, light responses that are different from each other.

Figure 13:
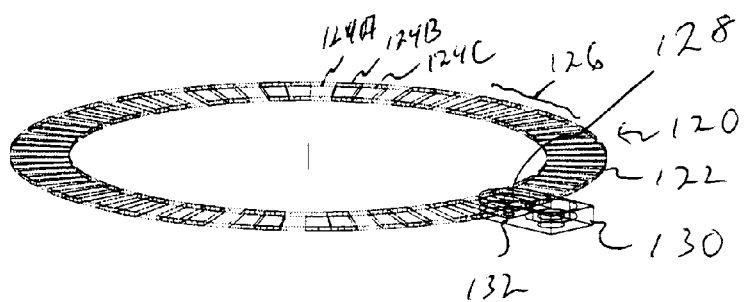
FIG. 13 depicts, in three dimensional form, a side elevational view of the disk of claim 12.

Placing the target areas on a wheel or disk 120, as depicted in FIGS. 12 and 13, also provides for directional determination by the detector. For example, if the target areas pass before detector port 128 in a red-green-yellow order, then that indicates that the disk 120 is turning counterclockwise in FIG. 12, whereas as if the target areas 120A–C pass before detector port 128 in a yellow-green-red order then the disk 120 is turning in a clockwise direction. The fluorophore-containing material found at target areas 124A–C can be provided either via a flexible film, a fluorescent paint, a glue, contained within the disk material itself, or otherwise as may be desired. In FIG. 13, module 130 provides a detector port 128 sized to receive a light guide such as an optical fiber, a liquid light guide or any other light guide that may be desired (not shown in this Figure), that can optically couple disk 120 to a detector or an excitation light source. In the embodiment depicted in FIG. 13, module 130 comprises an illumination port 132 and a detection port 128 so that light can be introduced to one side of the disc and then fluorescent or other desired light can be read via detection port 128 from the other side of the disc. If desired, the illumination and detection ports can be disposed on one side of the wheel, for example in a side-by-side configuration, or a single light guide can be disposed in a single illumination and detection port and provide both illumination and detection; other arrangements are also possible if desired.

Illumination port 132 can be connected via a light guide to an excitation light source, which excitation light source can provide a plurality of selected wavelength bands of excitation light, white light, or monochromatic light, as desired. In some embodiments, the excitation light can be provided from an excitation light source that itself emits only certain desired wavelengths bands of light. Alternatively, one or more band pass or short pass filters, or other filters, mirrors or other suitable optical elements can be provided to select only desired illumination light. Typically, such short pass or band pass filters will be disposed in an illumination light path between the light source and the target surface such that the filter will transmit the excitation light and substantially no other light, which means that the desired excitation light wavelength or wavelength band will be significantly and detectably enhanced relative to other light from the light source. Preferably, the filter transmits only the desired light and no other light.

Detection port 134 is optically coupled to a detector, as described above, able to differentially determine the presence of at least each of the fluorescent or other light responses provided from the target areas. In certain embodiments, one or more long pass or band pass filters, or other filters, mirrors or other suitable optical elements, can be disposed in the detection light path between the target surface and the detector such that the filter transmits the light emanating from a given target areas and substantially and no other light. This arrangement can be advantageous, for example, where only fluorescent light is being detected because the long pass or band pass filter can substantially remove the wavelength or wavelength band of the excitation light thereby improving the signal to noise ratio and other features of the detection light because only the fluorescence response will be found in the detection light.

Figure 14:
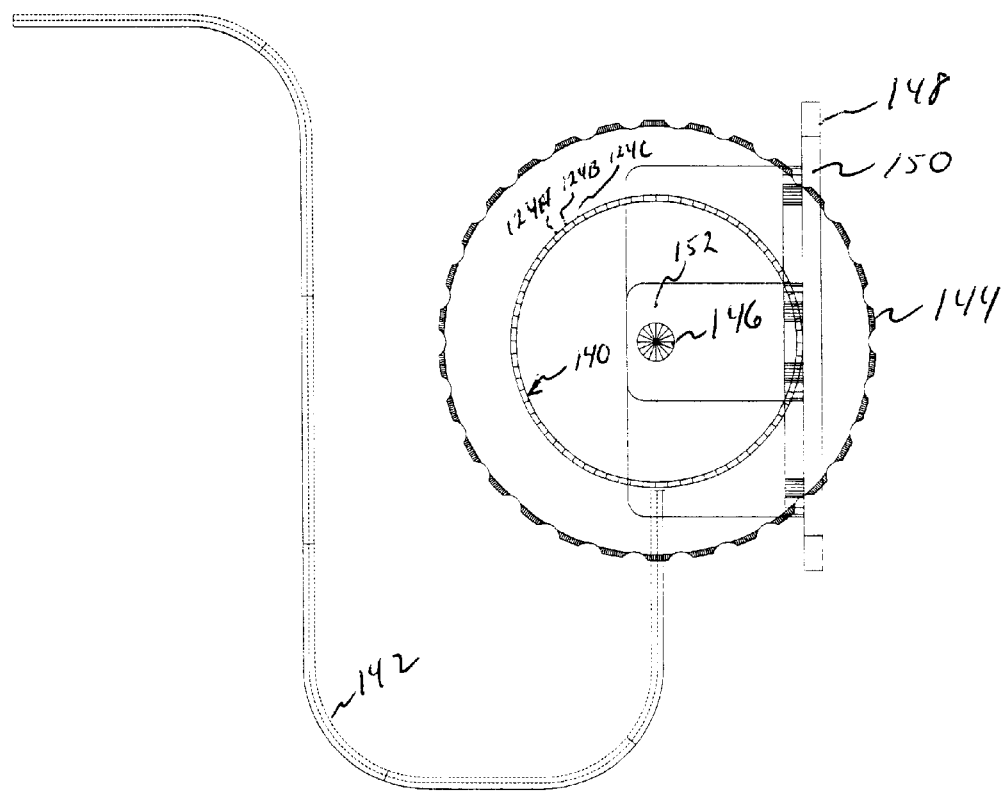
FIG. 14 presents a top plan view, in schematic form, of a drum comprising of plurality of different light response areas connected to a thumb wheel.
Figure 15:
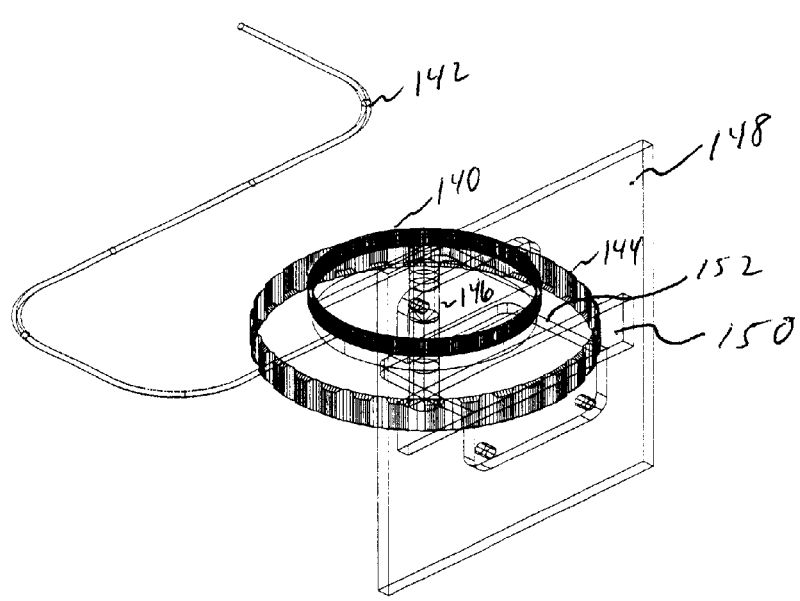
FIG. 15 depicts a side elevational view of the drum and thumb wheel assembly of FIG. 14.

FIGS. 14 and 15 provide three views of an alternative embodiment of the invention, wherein target areas 124A–C are disposed on the outer surface of a drum 140. In alternative embodiments, target areas 124A–C can be disposed on the inner surface of the drum, or can provide the thickness of the drum surface. A light guide 142, which is flexible in FIGS. 14 and 15, both provides excitation light to, and collects light for detection from, target areas 124A–C. Thumb wheel 144 rotates about a common axle 146 with drum 140 and provides an assembly to control the speed of rotation and direction of drum 140. In alternative embodiments, drum 140 and thumb wheel 144 can be connected, for example, at a different axis, or via linkages or mechanical couplings. Additionally, thumb wheel 144 could be any other desired manually activated device such as a sliding or toggle switch, or a depressible tab, as well as to motors, sliding positioners, or otherwise as desired. In FIGS. 14 and 15, the thumb wheel and drum assembly are attached via a retaining tab 152 to housing 148 having slot 150, thumb wheel 144 protrudes through slot 150 so that a user can rotate thumb wheel 144 without contacting or interfering with drum 140.

Figure 16:
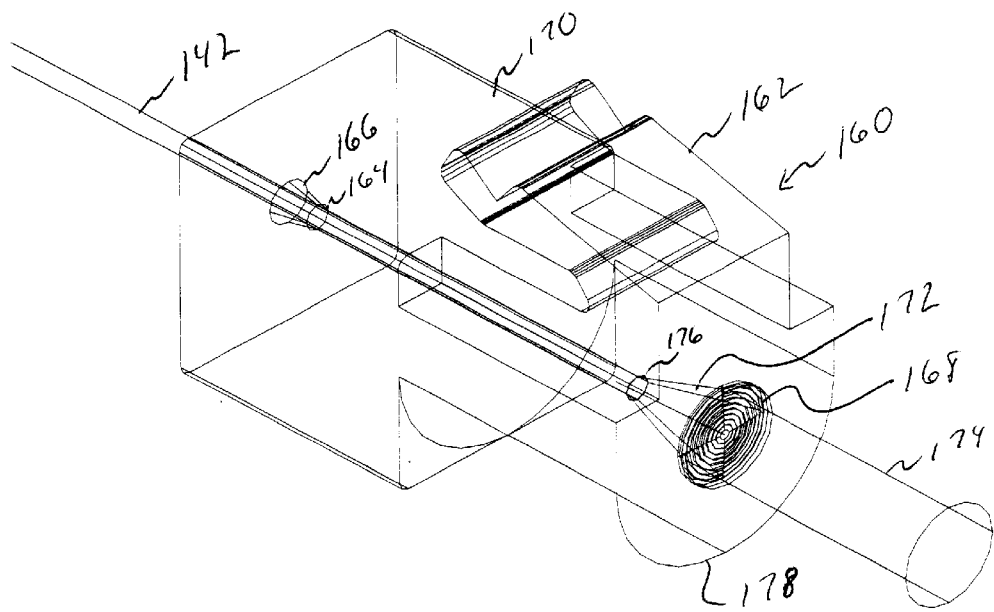
FIG. 16 depicts side elevational view of an optical plug suitable for use with an optical switch.
Figure 17:
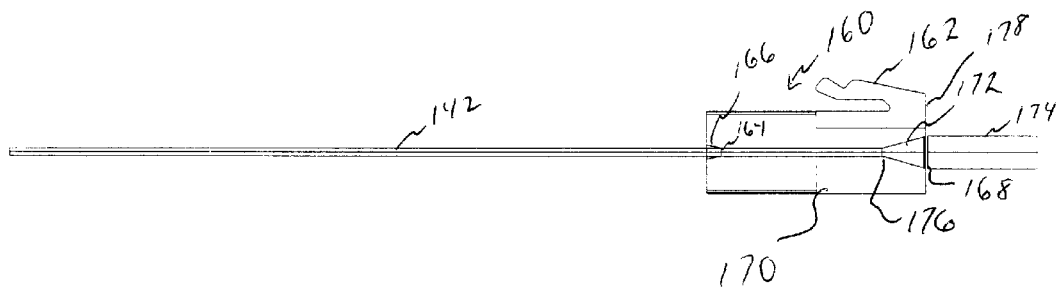
FIG. 17 depicts a side plan view of the plug of FIG. 16.

FIGS. 16 and 17 depict two views of a plug-in portion of an optical switch that comprises a plug 160 and of light guide 142. The plug can be used any of the illumination end, the optical switch end or the detector end. Plug 160 comprises a body 170 made of plastic, metal, or other desirable material. Body 170 comprises a depressible tab 162 capable of removably inserting and/or retaining plug 160 in a desired location, such as in a receptor of an optical switch that can contain a drum or disk as described above. In other embodiments, other types of retainer system can also be used, for either removable or permanent attachment, such as flanges with corresponding reception slots, protrusions with corresponding receiving depressions, snaps, clamps, screws or glue. In the embodiment depicted in FIGS. 16 and 17, body 170 comprises an axial passage 164 comprising a slightly conical receiving end 166 sized to receive and hold light guide 142. Light guide 142 is pushed into and through channel or passage 164 until it reaches a desired depth. In the embodiment shown, the light guide 142 is disposed within passage 164 until an end 176 of light guide 142 reaches the end of the channel. The end of the channel may be a planar or planar-angled optical surface or other optical surface as desired. Optical coupling material such as refractive index matching liquids, glues or gels may be used to reduce reflective losses. In one embodiment an index matching gel (Nye Optical Products) is used to couple the light from the light guide 142 into an optically transmitting portion of body 170 of the plug; the entire body 170 can be made of the optically transmitting material if desired. Light propagates from the fiber in a conical path 172 defined by the numerical aperture of the fiber and the refractive index of the material of body 170 of the plug. The material of body 170 may be selected for various optical properties such as its refractive index and wavelengths of transmission. Thus it can further be used as a wavelength selective filter element. In an alternative embodiment, the optically transmitting portion of the body 170 can define a vacuum or airspace, in which case the optically transmitting portion defines a passage, typically conical, between the end of the light guide and the element receiving the light. The propagating cone of light 172 then strikes collimating lens 168 disposed at the distal surface 178 of body 170. In FIGS. 16 and 17 the collimating lens is a Fresnel lens. Appropriate optical elements include focusing lenses, other elements that collimate or focus and other elements that provide any other desired function, such as beam splitting. If desired, light guide 142 can contact collimating lens 168. Additionally, in some embodiments the collimating lens can be eliminated or placed in the receiving block, and the light guide 142 can directly contact or emit light to the receiving optical element, such as the collimating lens or a multi-fluorescent response element such as the wheels, discs and drums described herein.

Figures 18, 19:
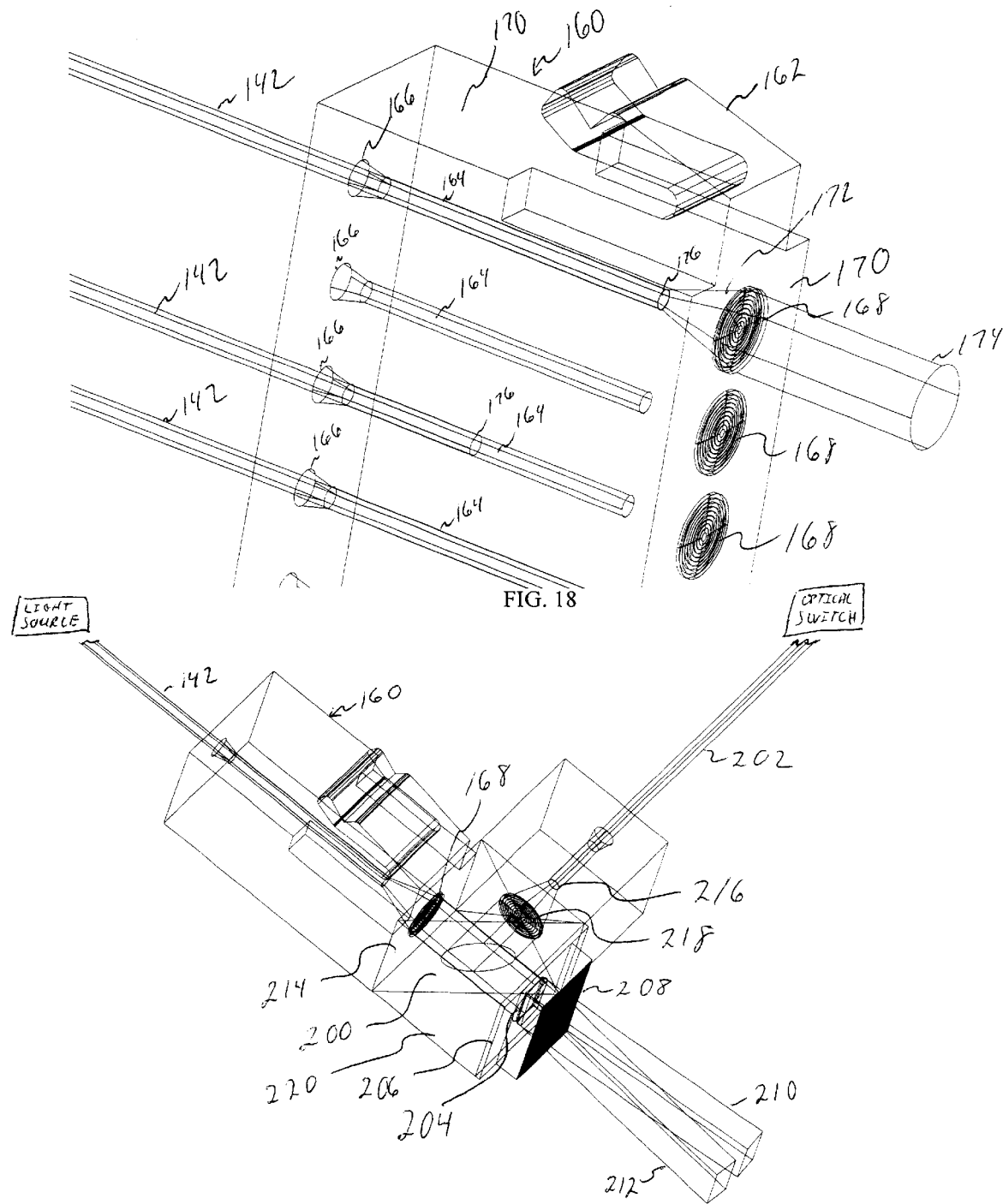
FIG. 18 depicts a schematic side elevational view, in three dimensional format, of an optical plug as depicted in FIGS. 16 and 17 further comprising a plurality of light guides.
FIG. 19 depicts a schematic side elevational view of an optical coupling suitable for providing light from a light source to an optical switch.

Light from light guide 142 is then ejected as light beam 174. Plug 160 can also be used for detection merely by detecting an incoming light beam and then conducting the light from the distal surface 178 and then transmitting the light through body 170 and then out along light guide 142 to a desired detector, controller or other suitable device. FIG. 18 depicts a plug similar to that shown in FIGS. 16 and 17 with the addition that a plurality of light guides 142 and light guide passages 164 are provided. In the embodiment depicted in FIG. 18, different light guides are inserted different depths into the various passages 164, including one passage that has not yet received a light guide 142. Typically, each of the passages 164 will receive at least one light guide.

FIG. 19 depicts a preferred approach to providing illumination light to, and collecting fluorescent response from, the optical switches described herein. Optical plug 160 carries blue light, or other desirable excitation light, from a light source (not shown) to the distal end 214 of plug 160, shining the light through collimating lens 168. The light then reflects off dichroic mirror 200 disposed at a 45 angle (or other angle as desired) relative to the direction of the excitation light, thereby directing the excitation light into the receiving end 216 and focusing lens 218 of a receiving light guide 202. The light then travels down receiving light guide 202 to an optical switch as described herein. If desired, the dichroic mirror, which is depicted in block form in FIG. 19 but could also be a flat mirror, a beam splitter, or any other desired optical element that directs illumination light and response light differentially, could shine the illumination light directly on the target material of the fluorescent switch, and the dichroic mirror could be moveable, such as rotatable, instead of or in addition to the moveability of the target surface. As depicted in FIG. 19, the fluorescence response, such as red and green light, is then transmitted back up receiving light guide 202 (or other collection device), along with any reflected excitation light. Dichroic mirror 200 directs any excitation light back down light guide 142 while directing the return red and green light in another direction to a light port 204 in a distal wall of a block 220 containing the dichroic mirror. In certain embodiments, a diffraction grating 208 or other color separation device, such as a prism, separates the return light into its component colors. In FIG. 19, the light is separated into red light beam 210 and green light beam 212. The separated light beams can then be easily detected by any of several detectors and detection methods according to the desires of the users.

Thus in some aspects the present invention provides optical switches comprising a target surface comprising a fluorophore-containing target material, the target surface comprising a first target area that provides a first fluorescent response when illuminated by excitation light and a second target area that provides a second light response when illuminated. The second target area can contain substantially no fluorophores and thus return substantially no fluorescence light or the second light response can comprise detectably different wavelengths or wavelength bands of fluorescent light from the first fluorescent response, different intensities, or different combinations of light comprising. The first and second target areas can each comprise at least one fluorophore that responds to a same or different wavelength or wavelength band of excitation light. The switch can further comprise a third target area that provides a third fluorescent response that is different from both the first fluorescent response and the second light response. At least a portion of the target surface can be flexible, such as a flexible film.

The switch can further comprise a light guide that conducts light from an excitation light source to the target or a light guide that conducts light from the target to a detector, which can be a single light guide or different light guides. The switch can further comprise an actuator coupled to at least one of the light guide and the target such that the actuator moves a light port in the light guide between at least the first target area and the second target area, or a moveable mirror surface optically coupled to at least one of the light guide and the target such that moving the moveable mirror surface, such as a dichroic mirror moves the excitation light between at least the first target area and the second target area. The switch can further comprise an excitation light source optically coupled to the target or a detector able to detect and differentially determine the presence of at least each fluorescent response. The switch can further comprise plurality of detectors, each able to detect and differentially determine the presence of at least one of the fluorescent responses. The excitation light source can provide a plurality of selected wavelength bands of excitation light.

The optical switch can also comprise a short pass or band pass filter disposed in an illumination light path between the light source and the target surface, wherein the filter transmits the excitation light and substantially no other light, or a long pass or band pass filter disposed in a detection light path between the target surface and the detector, wherein the filter transmits the light emanating from at least one of the target areas and substantially no other light.

In other embodiments, the present invention provides methods of making an optical switch comprising a target surface that provides a plurality of optical responses, comprising: a) placing a fluorophore-containing target material in a first target location of the switch, the fluorophore-containing target material comprising a surface defining a first target area that provides a first fluorescent response when illuminated by excitation light, and b) providing the switch with a second target area that provides a second light response when illuminated, wherein the target areas are as described elsewhere herein. One or more additional target areas may be added if desired.

In further embodiments, the present invention provides methods of optical switching comprising: a) illuminating with excitation light a first target area disposed on a target surface defining a portion of an optical switch, wherein the first target area provides a first fluorescent response when illuminated; or b) illuminating a second target area disposed on the target surface that provides a second light response when illuminated; c) collecting the first or second response; and d) determining therefrom whether the first target area or the second target area of the target surface was illuminated. The target areas are as described elsewhere herein, and one or more additional target areas may be added if desired.

The present invention also provides kits comprising, and containers holding, optical switches as described herein.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. An optical switch comprising a target surface comprising a fluorophore-containing target material, the target surface comprising a first target area that provides a first fluorescent response when illuminated by excitation light and a second target area that provides a second light response when illuminated wherein the switch further comprises a first light guide that conducts light from an excitation light source to the target wherein the switch further comprises a second light guide that conducts light from the target to a detector wherein the first light guide and the second light guide are different light guides wherein at least one of the light guides is an optical fiber and wherein the switch further comprises a moveable mirror surface optically coupled to at least one of the light guide and the target such that moving the moveable mirror surface moves the excitation light between at least the first target area and the second target area.

2. The optical switch of claim 1 wherein the moveable mirror surface comprises a dichroic mirror.

* * * * *